United States Patent [19]
Hendrix

[11] Patent Number: 5,882,374
[45] Date of Patent: Mar. 16, 1999

[54] PROCESS FOR PRODUCING FOUNDRY IRON WITH AN INSULATED ELECTRODE

[75] Inventor: Charles F. Hendrix, Pell City, Ala.

[73] Assignee: Alabama Power Company, Birmingham, Ala.

[21] Appl. No.: 774,210

[22] Filed: Dec. 27, 1996

Related U.S. Application Data

[63] Continuation-in-part of Ser. No. 431,845, May 1, 1995, Pat. No. 5,588,982.
[51] Int. Cl.$^6$ .............................. C21B 11/10; C22B 4/00
[52] U.S. Cl. .................. 75/10.19; 75/10.21; 75/10.22; 75/10.27; 75/10.33; 75/10.41; 75/10.42; 75/10.61
[58] Field of Search .............................. 75/10.19, 10.21, 75/10.22, 10.27, 10.33, 10.41, 10.42, 10.61

[56] References Cited

U.S. PATENT DOCUMENTS

| | | | |
|---|---|---|---|
| 2,242,219 | 5/1941 | Baily | 420/29 |
| 3,768,997 | 10/1973 | Bliss et al. | 75/10.5 |
| 4,491,472 | 1/1985 | Stevenson et al. | 75/10 R |
| 4,530,853 | 7/1985 | Lewallen et al. | 427/113 |
| 4,613,363 | 9/1986 | Wienert | 75/10.62 |
| 4,731,112 | 3/1988 | Hoffman | 75/10.22 |
| 4,772,514 | 9/1988 | Neufuss et al. | 373/88 |
| 4,995,051 | 2/1991 | Hakulin et al. | 373/81 |
| 5,507,933 | 4/1996 | de Nora et al. | 204/243 R |
| 5,588,982 | 12/1996 | Hendrix | 75/10.61 |
| 5,654,976 | 8/1997 | Cowx et al. | 75/10.42 |

OTHER PUBLICATIONS

"Reclaiming Metal Values from Spent Pickling Wastes", Hanewald et al., INMETCO, Ellwood City, PA, Oct. 18–20, 1993.

"CONTIARC, A New Scrap Melting Technology", Hofmann et al., Second Int'l Symposium on Metallurgical Processes for the Year 2000 and Beyond, San Diego, Sep. 1994.

"Electric–Furnace Ironmaking in Venezuela", Journal of Metals, Sep. 1963.

"New Zealand Steel: A Decade of Progress", Metal Bulletin Monthly, Mar. 1980.

"Direct Reduction at New Zealand's Glenbrook Works", Evans, Steel Times International, Dec. 1986.

"Refining Liquid Pig Iron in Electric Arc Furnaces", Durrer et al., Journal of the Iron and Steel Institute, May 1959.

"Electric Ironmaking Furnaces, A Competitor to the Blast Furnace?", Astier, *Journal of Metals*, Sep. 1963.

"Prospects Brighten for NZ Steel", *MBM*, Nov. 1989.

"Innovative Ironmaking at New Zealand Steel", Crawford, *Ironmaking*, 1982, No Month.

*Primary Examiner*—Melvyn Andrews
*Attorney, Agent, or Firm*—Roylance,Abrams,Berdo & Goodman, L.L.P.

[57] ABSTRACT

A submerged arc furnace having a partially insulated electrode produces molten metal such as foundry iron from scrap iron and steel sources where little or no slag is produced. The metal source, scrap iron or steel is fed into the submerged arc furnace with a source of silica and a carbonaceous reducing agent. The scrap iron and steel is melted while simultaneously smelting the silica in the presence of the carbonaceous reducing agent. The insulation surrounding the electrode can be a silica containing material, such as fiberglass, which is reduced to provide silicon to the molten metal. The amount of the silica source and carbonaceous reducing agent are added in an amount to selectively control the silicon and carbon content of the resulting foundry iron.

32 Claims, 1 Drawing Sheet

PROCESS FOR PRODUCING FOUNDRY IRON WITH AN INSULATED ELECTRODE

CROSS-REFERENCE TO RELATED APPLICATION

This application is a continuation-in-part application of Ser. No. 08/431,845, filed on May 1, 1995, now U.S. Pat. No. 5,588,982, in the name of Charles F. Hendrix and entitled "Process for Producing Foundry Iron", the subject matter of which is hereby incorporated by reference in its entirety.

FIELD OF THE INVENTION

The present invention relates to an insulated electrode, an electric furnace with an insulated electrode and a process for producing molten metal using an insulated electrode. More particularly, the invention is directed to an insulated electrode having insulating material surrounding and bonded to portions of the electrode, and to an apparatus for and a process of producing foundry iron from scrap iron or scrap steel as the primary iron sources in an electric arc furnace having an insulated electrode.

BACKGROUND OF THE INVENTION

Foundry iron, used for casting and steel making, is produced in the iron industry in a number of different processes. The process used is typically dependent on the feed material and the intended use of the foundry iron.

One process of producing foundry iron utilizes a standard cupola-type furnace. A variety of iron sources such as scrap iron, scrap steel and pig iron are fed into the vertical shaft of the furnace fueled by combustion of coke by a blast of air. The charge added to the furnace generally contains a number of additives such as ferrosilicon to increase the silicon content of the iron and slag forming materials such as limestone to remove impurities such as sulfur. The iron produced by this process typically contains about 1 percent to 3 percent silicon and about 2 percent to 4 percent carbon.

The cupola-type furnace disadvantageously is a net silicon oxidizer with the result that as much as 30 percent of the available silicon charged is lost by oxidation and discharged in the slag. Typically, only about 70 percent of the available silicon charged reports to the iron. Silicon is an essential element of foundry iron and is typically added in the form of ferrosilicon since such a form of silicon is readily combinable with the iron. Ferrosilicon is an expensive source of silicon such that silicon losses through oxidation can significantly increase production costs.

The cupola-type furnace is often desirable since it can be energy efficient and requires a relatively low capital investment. A cupola furnace is also easily scaled up for large production from a single unit and can be operated as a continuous charging and tapping process. Carbon is easily combined with the iron and is picked up naturally in the cupola as the melted iron and steel droplets pass over the hot coke and dissolve the carbon.

The feasibility of producing foundry iron is dependent in part on the efficiency of the process used and cost of the charging materials. The cost of scrap iron and scrap steel depends on several factors including the iron content, amounts of desirable and undesirable alloy constituents present, and the particle size. The cost of very fine or light scrap iron and steel, such as borings or turnings, is typically much less than heavier scrap such that it is desirable to use light scrap whenever practical. The use of light scrap in a cupola requires agglomeration or briquetting since the high volume of gases exiting the cupola otherwise carries an unacceptably large percentage of the charge from the furnace. Very fine or light iron scrap will be collected in the baghouse or scrubber resulting in a low recovery of iron and thus increased operating cost.

Foundry iron is also produced conventionally and commercially with the electric induction furnace. In the electric induction furnace the charge, which can be iron scrap, steel scrap and pig iron, is introduced into the furnace, melted; and, then additives, including silicon, carbon, and a slag forming material to cover the iron are introduced. The iron charge is heated by eddy currents resulting from electromagnetic induction from the alternating electric current flowing in the coil surrounding the charge. Silicon is typically added as ferrosilicon, and carbon is added in the form of a low sulfur content graphite material. The resulting iron generally has a silicon content of about 1–3 percent and a carbon content of about 2–4 percent.

The electric induction furnace disadvantageously is limited to a batch process where individual units are typically capable of producing less than 20 tons of iron per hour. In addition, the electric energy is typically applied only about 80% of the time, resulting in inefficiency. Other disadvantages include the moderate to high refractory costs, high capital investment, high labor costs, high cost of ferrosilicon and carburizing additives, and limited scale up capability of the induction furnace.

Although not usually economical, foundry iron has been produced commercially in standard-type electric arc furnaces (EAF). The EAF typically consists of a refractory lined vessel or shell with a removable refractory roof through which three electrodes in a three phase AC furnace, or one electrode in a DC furnace protrude into the space above the charge material and bath contained within the furnace shell. For DC furnaces, the return electrode is typically built into the bottom of the furnace shell.

The operation of the electric arc furnace typically consists of charging the furnace by swinging the roof aside and emptying one or more charge buckets containing iron or steel scrap and other materials into the shell, closing the roof, and then lowering the electrodes until contact is made with the charge and arcing and melting of the charge occurs. After melting, a slag layer is usually established for refining purposes, and additions of ferrosilicon and carbon are made until the foundry iron composition reaches the desired target. The furnace is then tapped, any needed refractory repairs made, and the cycle repeated.

In recent years, the EAF has not been used extensively for production of foundry iron alloys because of the relatively high production cost. The EAF is not economical for the production of foundry irons because of the high cost of ferrosilicon and carbon additions required, and because it is a batch process. Presently, the use of the EAF has been mostly limited by economics to the production of special alloy foundry irons, and steels, which may not be readily or economically produced in either cupolas or in induction furnaces.

Another process of producing foundry iron is by smelting iron ore in a submerged arc electric furnace. Submerged arc furnaces have an advantage of directly smelting the ores using the heat of the electric arc along with simultaneous carbothermic chemical reduction of metal oxides by the carbonaceous reducing agents, such as coke and coal. The electrodes are immersed in the charge and slag layer which forms above the molten iron. That arrangement permits efficient heat transfer between the arc and charge materials. However, the nature of the heating in the submerged arc furnace requires that the electrical conductivity of the charge be controlled to permit the simultaneous immersion of the electrodes deep into the charge while avoiding excessive currents in the electrodes, which excessive currents could cause the electrodes to overheat.

Iron ore has low electrical conductivity making it amenable to smelting in a submerged arc furnace. The prior production of foundry iron in submerged arc furnaces generally uses iron ore in the form of fines, lumps or pellets as the primary source of iron. One example of the use of a submerged arc furnace to smelt iron ore is disclosed in U.S. Pat. No. 4,613,363 to Weinert. A disadvantage of the conventional iron producing processes using a submerged arc furnace is that the carbothermic reduction of ores to produce iron requires large amounts of electric energy, thereby increasing the production costs. Alternatively, the more widely utilized processes of producing foundry iron (cupola and induction furnaces) require comparatively expensive starting materials, such as heavy iron or steel scrap; and prior-reduced silicon sources such as silicon carbide or ferrosilicon, which are relatively expensive sources of silicon. All of these characteristics have limited these prior processes for producing foundry iron.

More recently, submerged arc furnaces have been used to melt scrap metal as disclosed in U.S. Pat. No. 5,555,259 to Feuerstache. The furnace is formed with a center pipe surrounding the cathode which prevents the charge from contacting the side of the cathode. The cathode extends beyond the pipe to form an arc between the cathode and an anode and melt the charge. The lower end of the pipe is tapered for feeding the scrap to the cathode. The pipe surrounding the cathode enables the cathode to be positioned deep in the charge bed. This construction, however, has several disadvantages including, for example, the complex and expensive water cooled components and complex electrical connection for the electrodes. In addition, the water cooled components within the shell of the electric arc furnace near the electric arc create potential safety concerns.

Accordingly, the iron foundry industry has a continuing need for an economical and efficient process for producing foundry iron.

SUMMARY OF THE INVENTION

Accordingly, a primary object of the invention is to provide an electrode for an electric arc furnace that can be immersed deep into the charge material within the furnace, even when the charge materials are electrically conductive, without having to operate at reduced voltage.

Another object of the invention is to provide an electric arc furnace electrode that is partially covered with an electrically insulating material to limit the surface area of the bare electrode in contact with charge materials.

A further object of the invention is to provide an electrode for an electric arc furnace having a consumable silica-containing insulating material surrounding a portion of the electrode.

Another object of the present invention is to provide an efficient and economical process for producing foundry iron using readily available and inexpensive feed materials in a submerged arc furnace.

A further object of the present invention is to provide a process for using scrap iron or scrap steel as the primary source of iron for producing foundry iron.

Yet another object of the present invention is to provide a process of melting scrap iron or scrap steel in a submerged arc furnace.

A further object of the present invention is to provide a process for simultaneously smelting a silica-containing insulating material and provide an electrode for melting scrap iron or steel to produce foundry iron.

Another object of the present invention is to provide a process for producing foundry iron where substantially no slag is formed.

A further object of the present invention is to provide a process for simultaneously melting scrap iron or steel in a submerged arc furnace and carbothermally smelting iron containing materials and silicon sources to increase the silicon and carbon content of the iron to produce foundry iron.

These and other objects of the present invention are basically attained by providing an electrode for an electric arc furnace, comprising: an electrically conductive member having a lower end, an upper end and a longitudinal midsection between the ends, and an electrically insulating material surrounding and bonded to the midsection, with the lower end being substantially free of insulating material.

These objects are further attained by providing an electric arc furnace comprising: a vessel having a melting zone and an inlet for feeding a charge into the vessel, at least one first electrode positioned in the vessel having an electrically insulating material surrounding and bonded to a portion of said electrode, said electrode having a lower end substantially free of said insulating material and positioned in the melting zone and having an upper end coupled to an electrical power source, and at least one second electrode positioned in the vessel for producing an arc in the melting zone with the first electrode and coupled to the electrical power source.

These objects are also attained by a process of producing molten metal in an electric arc furnace comprising the steps of: feeding a charge into an electric arc furnace with at least one first electrode having a lower end for cooperating with a second electrode, the at least one first electrode having an upper end coupled to a movable mounting structure for raising and lowering the electrode with respect to a charge bed in said furnace and having an electrically insulating material covering a portion of the first electrode and insulating said first electrode from the charge bed, the charge comprising at least one metal, metal compound or mixture thereof; immersing at least the first electrode into the charge bed; supplying electrical energy to the electrodes to generate an electric arc therebetween; and heating the charge in the furnace by the electrical arc between electrodes to produce the molten metal.

The process of the present invention is able to utilize inexpensive scrap iron or steel in the submerged arc furnace to produce foundry iron, while controlling the carbon and silicon content and substantially in the absence of slag formation. The silica-containing insulating material or other silicon source is reduced to silicon in the presence of a carbonaceous reducing agent to increase and modify the silicon content of the foundry iron. The insulated portion of the electrode enables the electrode to be emerged deeper in the charge than an uninsulated electrode without reducing the voltage. The carbonaceous reducing agent also provides carbon which is dissolved in the iron.

The objects are also attained by providing a process of producing foundry iron comprising the steps of: feeding a charge into an arc furnace about electrodes thereof, the charge comprising a mixture of a silicon source, an iron source, and a carbonaceous reducing agent, the iron source comprising ore, mill scale, DRI, HBI, scrap iron or scrap steel, at least one of the electrodes being partially surrounded with an insulating material for shielding a portion of the electrode from the charge material; supplying electrical energy to the electrodes to generate an electrical arc therebetween; and heating the charge by the electrical arc between the electrodes to melt the charge, reduce the metal oxides and silica (including the insulating material) to produce foundry iron. The foundry iron can have a silicon content of about 0.05 percent to about 9.5 percent by weight and a carbon content of about 0.01 percent to about 4.5 percent by weight substantially in the absence of slag. The process can be continuous by continuously feeding the charge.

The objects are further attained by a continuous process of producing molten metal alloys comprising the steps of: continuously feeding a charge comprising at least one metal source which may include metal oxides, and, when desired, a carbonaceous reducing agent into an arc furnace about at least one electrode having an upper end coupled to a power source, a lower end, a main body section extending between the upper and lower end and having a coating containing electrical insulating material surrounding and attached to the main body section with the insulating material containing a metal enhancing additive; supplying electrical energy to the electrode to generate an electrical arc; and melting the metal and simultaneously smelting the insulating material coating in the presence of a carbonaceous reducing agent by the electrical arc between the electrodes to produce molten metal.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this original disclosure.

DETAILED DESCRIPTION OF THE INVENTION

The present invention is directed to an insulated electrode, an electric arc furnace having an electrode partially covered with an electrical insulation and to a process of producing molten metal using the furnace. The insulation covers the sides of the electrode leaving the tip exposed for producing the arc in the furnace. The insulation enables the electrode to be embedded deeper into the charge bed at a given voltage and power input compared to standard or conventional uninsulated electrodes.

In embodiments of the invention, the insulation covering the electrode is a silica-containing material. The silica-containing insulation is gradually consumed with the electrode during use which serves as a silica source for the primary metal in the feed. The silica is reduced to silicon in the furnace in the presence of a suitable reducing agent. The reducing agent can be, for example, a carbonaceous reducing agent.

Efficient production of alloys from charge materials that are good conductors of electricity in a submerged arc furnace requires deep penetration of the electrode into the charge bed. The electrode penetration is critical to the efficiency of the process, since the heat transfer efficiency from the electric arc relates to the depth of the arc below the surface of the charge. Deeper penetration of the electrodes yields better heat transfer efficiency. The enhanced heat transfer efficiency reduces the energy requirement, lowers the refractory consumption, lowers the electrode consumption, improves recovery efficiencies and produces higher yields.

The invention is further directed to processes of producing metals and metal alloys using an electric arc and particularly a submerged arc furnace having a partially shielded or insulated electrode. The process of the invention is particularly directed to producing foundry iron although other metals can be processed including, for example, aluminum, aluminum alloys, steel, copper, copper alloys, magnesium, manganese, chromium, precious metals and the like.

The process of the present invention basically comprises feeding a primary metal source, such as scrap iron or steel as a primary iron source, and carbonaceous materials which serve both as a carbon source for the iron and as reducing agents, into a submerged arc furnace. In embodiments of the present invention, silica or a silica source can be added with the charge as a primary silicon source. In further embodiments at least one of the electrodes of the submerged arc furnace includes an insulating layer formed of silica or silica containing materials such as fiberglass. The silica or silica containing material is consumed by the arc to provide a source of silica to the charge. The heat produced by the electric arc in the furnace reduces the silica in the presence of a carbonaceous reducing agent to silicon which is taken up by the primary metal along with carbon from the reducing agents. In preferred embodiments, the process is carried out as a continuous process of simultaneously melting the primary metal sources and smelting the silica sources in the presence of the carbonaceous reducing agent.

As used herein, foundry iron is used to define the resulting iron product having at least about 0.05 percent by weight silicon and at least about 0.01 percent by weight carbon. The class of foundry iron includes various iron compositions, including, for example, pig iron, gray iron, ductile iron, malleable iron and cast iron. The foundry iron produced by the invention can be used directly without further processing to produce the desired product depending on the intended use of the iron. In further embodiments, the resulting foundry iron can be further processed to modify the composition and nature of the iron such as, for example, to produce steel.

In embodiments of the invention, the resulting foundry iron contains about 0.05 percent to about 9.5 percent silicon and about 0.01 percent to about 4.5 percent carbon with the balance iron and minor amounts of impurities such as sulfur, phosphorous, manganese, aluminum, chromium, titanium and other metals. As used herein the percentages are by weight unless otherwise indicated. In preferred embodiments of the invention, the foundry iron preferably comprises about 0.05 to about 9.5 percent silicon, and more preferably about 0.5 percent to about 4.0 percent silicon and about 2.0 percent to about 4.0 percent carbon. Typically, the foundry iron contains less than 3.0 percent silicon, about 2.0 percent to about 4.0 percent carbon and less than about 1.0 percent sulfur, phosphorous, aluminum, manganese, chromium and other impurities. Preferably, the foundry iron contains 0.10 percent by weight or less sulfur. In embodiments, the foundry iron contains about 0.25 to 3.0 percent by weight silicon. In further embodiments, the foundry iron contains about 2.0 percent by weight silicon.

Figure 1:
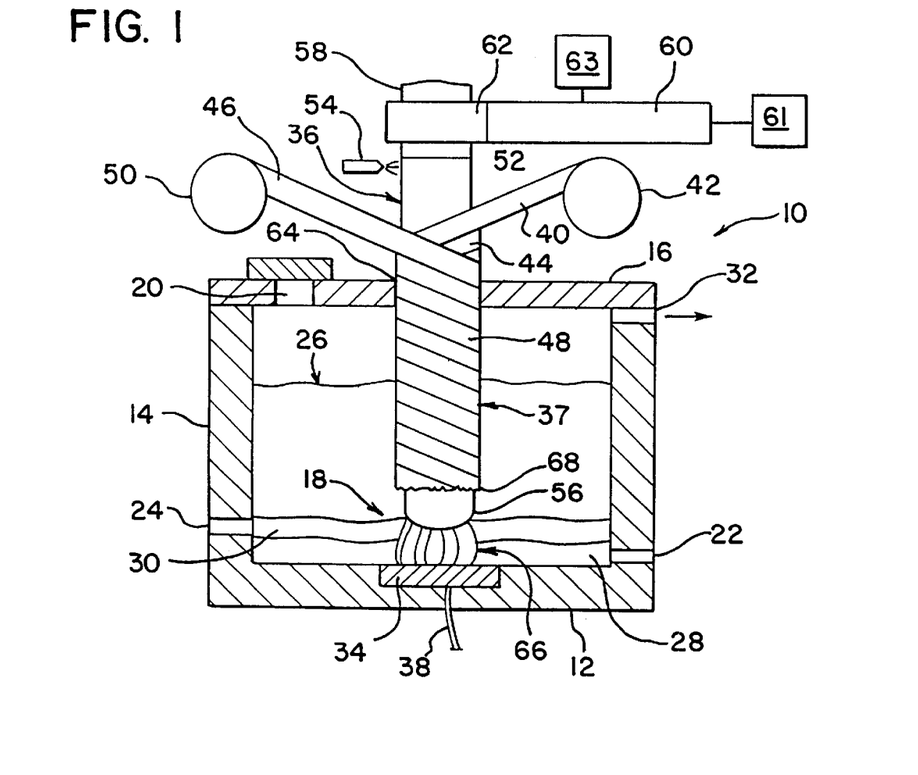
FIG. 1 is a side elevational view in cross-section of a submerged arc furnace for use in a process according to one embodiment of the present invention.

Referring to FIG. 1, a suitable submerged arc furnace for carrying out the process of the present invention is illustrated. The submerged arc furnace 10 defines a vessel which includes a bottom lining or hearth wall 12, side walls 14 and a roof or top wall enclosure 16 to define a melting and smelting zone 18 and to collect and remove dust, fumes, and gases to a collection system. A feed opening 20 is provided in the roof 16 for feeding the charge or feed material into the furnace 10 by conveyors or feed supplier (not shown). In an alternative feed system, the charge materials are introduced by dumping the feed directly on top of the existing charge 26 using a mechanical hopper charging scheme, as known in the art. One or more outlet taps 22 are included in the side wall 14 to withdraw molten metal 28 from the melting zone 18. A slag taphole 24 may also be included in side wall 14 to withdraw slag 30 from the melting zone 18. The shell of the furnace 10 can be cooled with a water film (not shown). A spray ring can be located immediately beneath the side wall roof flange whereby the water is collected in a gutter at the bottom of the side walls 14. In embodiments of the invention, the roof or top wall can be split in its longitudinal dimension to allow charge material to be fed to any point in the furnace.

Exhaust ducting 32 extends through the side wall 14 to collect and remove exhaust gases such as combustion gases, dust and fumes, emitted during the melting and smelting phases of the process. The exhaust gases can be carried to a baghouse to clean the gases before discharging the gases to the atmosphere. The solids collected in the baghouse are recycled, processed, or discarded in a conventional manner.

The submerged arc furnace illustrated in FIG. 1 is a DC submerged arc furnace having an anode 34 in the bottom wall 12 and a cathode 36 extending through the roof 16. The anode 34 is connected to a suitable DC power source by an electric connection 38. Preferably, the anode 34 is positioned below the cathode 36 as known in the art.

Cathode 36 extends through an opening 64 in the top wall 16 into the melting zone 18 of the furnace 10. The cathode 36 has a substantially cylindrical shape with a longitudinal dimension and is partially covered by an insulation layer 37. In the embodiment illustrated, the cathode 36 is wrapped in a spiral manner with a first fiberglass mat 40 that is fed from a supply roll 42 and forms a continuous first fiberglass insulating layer 44. A second fiberglass mat 46 is wrapped over the first layer 44 in a spiral fashion opposite the first fiberglass mat 40 to form a second continuous fiberglass layer 48. Fiberglass mat 46 is supplied from a supply roll 50. Preferably, the fiberglass mats 40 and 46 are wrapped in an overlapping pattern to ensure complete coverage of the cathode 36 in situ at the furnace. However, the insulation can be formed on the electrode prior to being mounted in the furnace. In preferred embodiments, an adhesive 52 is applied to the cathode 36 to secure the fiberglass mats 40, 46 in place. In the embodiment of FIG. 1, the adhesive 52 is sprayed onto the cathode 36 by a suitable spray nozzle 54. In alternative embodiments, the adhesive can be applied to the cathode 36 and/or the fiberglass mats 40, 46 by any suitable method such as painting, rolling, dipping or extrusion.

The fiberglass insulating layers 44 and 48 are wrapped around the cathode 36 so that the lower or bottom end 56 of the cathode 36 is exposed. The insulating layers 44, 48 cover a length of the cathode sufficient to effectively insulate the cathode from the charge materials and permit the cathode to be penetrated deep into the charge bed independent of the conductivity or resistivity of the charge bed. In the embodiment shown, the insulation covers a middle section or midsection around the circumference of the body of the cathode. In this manner, the tip of the electrode is exposed for producing the arc, while the remaining length of the electrode within the furnace is electrically insulated from the charge materials. The fiberglass mats can be woven or non-woven mats that are commercially available. In preferred embodiments, the thickness of the formed insulation layer 48 is about ¼ to ½ inch, but can be thicker or thinner depending on the operating conditions of the furnace and the composition of the charge fed to the furnace.

The adhesive is preferably an adhesive that will effectively bond the fiberglass or other insulating material to the cathode during use of the furnace without interfering with the processing of the metal or the operation of the furnace. The adhesive can be applied directly to the surface of the cathode as shown in FIG. 1 or applied to the fiberglass mat before or after the fiberglass mats are applied to the cathode. Alternatively, the fiberglass mat can be impregnated with an adhesive that can be activated by a solvent or heat to fuse the layers together.

An upper end 58 of the cathode 36 is not covered by the insulation 39 for connecting to a bus bar 60 by a clamping device 62. The bus bar 60 is electrically connected to an electrical power source 61 to supply power to the electrode. The bus bar 60 is also coupled to a support assembly 63 for raising and lowering the electrode into the charge 26 through an opening 64 in the roof 16 of furnace 10.

The electrodes can be, for example, graphite electrodes, prebaked carbon electrodes, Soderberg or self-baking carbon electrodes, or metal electrodes as known in the art. The electrodes are preferably carbon electrodes of the various forms known in the art.

In operation of the furnace 10, the charge is fed through opening 20 into the furnace 10 and the cathode 36 is lowered into the charge bed 26 and above the anode 34. Electric current is supplied to the electrodes 34 and 36 from power source 61 to produce an arc 66 between the lower end 56 of the cathode 36 and the anode 34. The insulating layer 37 on the cathode shields the cathode 36 from the charge material so that the cathode 36 can be positioned deep into the charge bed 26 without adjusting the resistivity of the charge bed or the power levels to the electrodes. During arcing, the lower end 56 of the electrode 36 is gradually consumed so that the position of the bus bar 60 is adjusted to maintain the proper position of the cathode 36 in the charge bed 26. The lower end 68 of the fiberglass insulating layer 37 is exposed to the intense heat from the arcing at the tip of the cathode 36 and is also consumed to provide a silica source to the charge. The resulting silica is then reduced to silicon in the presence of a carbonaceous reducing agent which is then combined with the primary metal of the charge. The thickness and silica content of the insulation layer is selected to provide the desired amount of silica to the charge.

Figure 2:
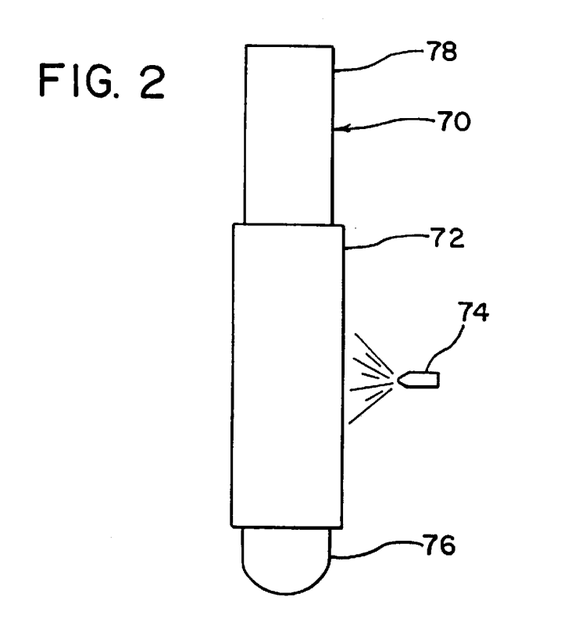
FIG. 2 is a side elevational view of an electrode coated with an insulating material according to a second embodiment of the invention.

Referring to FIG. 2, the electrically conductive electrode 70 in an alternative embodiment includes an electrically and thermally insulating layer 72 formed by spraying an insulating material from a spray nozzle 74. The electrode 70 is similar to the cathode of FIG. 1 having a lower end 76 extending beyond the insulating layer 72 and a bare upper end 78 for making electrical connection with the electrical power source of the furnace in a manner similar to the embodiment of FIG. 1. In further embodiments of the invention, the insulating layer 72 can be formed by dipping, painting, extruding, casting or other coating techniques as known in the art. The electrode 70 can be used as an anode or cathode in a DC electric arc furnace or as an electrode in an AC electric arc furnace.

Other coating methods include, for example, thermal spraying, such as plasma and flame spraying, fusion coatings, such as electrophoretic coatings and electrostatic coatings. Alternatively, the insulation can be applied by surface modification such as by electrolytic anodization. In a further embodiment, the insulation can be a preformed sleeve of suitable refractory material which fits over the electrode. The sleeve can be secured to the electrode in the desired position by adhesives, clamps, or other fastening means.

The insulation material is preferably a refractory material capable of electrically and thermally insulating the electrode without interfering with the operation of the electrode or the processing of the metal. Suitable refractory materials include glass, ceramics, mineral fibers, calcium silicate, diatomaceous earth, silica fireclay, high alumina diaspore clays, calcium aluminate, zirconia, magnesite, dolomite, forsterite, chromium ores, silicon carbide, berylia, thoria, and single or mixed oxides of aluminum, cobalt, chromium, magnesium, silicon and zirconium.

The adhesive is generally a furnace type cement such as sodium silicate or calcium aluminate cements. Other suitable adhesives include tar-based adhesives.

Examples of suitable DC submerged arc furnaces are produced by Mannesmann Demag Huettentechnik AG of Duisburg, Germany including the type sold under the tradename "Contiarc" and by Elkem Technology of Oslo, Norway. The DC submerged arc furnace has a single electrode submerged in the charge with a suitable return electrode in the bottom of the vessel as known in the art. In further embodiments, a plasma submerged arc furnace or an alternating current submerged arc furnace having at least two electrodes can be used.

In a further embodiment, the furnace is an alternating current furnace having three alternating current electrodes extending through the roof into the melting zone. The electrodes can be arranged in triangular or in-line configurations. One or more of the electrodes can have an insulating layer in the manner of the embodiments of FIGS. 1 and 2. The electrodes are independently controllable to selectively adjust their vertical position within the furnace, and to prevent overcurrents. The electrodes can be raised or lowered to vary the arc length as known in the art. The furnace is typically a three phase alternating current furnace powered by variably selectable voltage of about 30–1000 volts with a maximum current of approximately 100,000 amperes per phase.

The submerged arc furnace provides continuous production of molten metal, such as foundry iron, by permitting continuous feeding of the furnace with the charge material and tapping of the molten metal from the lower regions of the furnace. The process can be readily scaled up for high production rates, while still controlling the output rate and the output composition of the metal. A suitable feed conveyor, hopper charging system, or charging tubes as known in the art, can be used for continuously supplying the charge materials to the furnace. The throughput or production rate of the furnace is dependent on the power supplied to the furnace and the feed rate of materials to the furnace. The furnace can be designed for an operating power level of from about 1 megawatt to about 100 megawatts depending on the furnace construction, type of electrodes and charge materials. Generally the submerged arc furnace produces a ton of foundry iron product at an electric energy input of about 600 kilowatthours. Depending on the charge materials, product characteristics, and furnace construction, an alternating current submerged arc furnace can produce foundry iron at a rate of electric energy input of between about 500 to 1400 kilowatthours per ton of product.

The process of the invention is preferably carried out in the direct current submerged arc furnace using a feed and power level so that the tips of the electrodes are embedded several feet into the bed of feed material in the furnace and within about one foot from the bath of molten metal pool. In this manner, the arc zone is formed close to the metal pool or bath. The furnace is operated to maintain the temperature of the molten alloy bath in the furnace between about 2100° F. to 3200° F. In preferred embodiments the temperature of the bath is maintained sufficiently high to allow adequate superheating of the molten metal for easy tapping and downstream handling or processing. The tip of the electrode being submerged in the material and producing an arc close to the molten metal bath provides good heat transfer to the unprocessed material by radiation from the arc and the molten metal, and by convection from the hot carbon monoxide gas that is continuously being generated by the chemical reduction of metal oxides and silica by carbon in the lower regions of the charge bed. The DC submerged arc furnace is generally operated at a voltage of about 30–1000 volts and a maximum current of about 100,000 amperes per phase.

A standard submerged arc furnace includes a self-protection mechanism or control system to automatically raise the electrode(s) from the hearth to prevent excessive electrode currents which can result when the conductivity of the charge materials increases above a predetermined level. If the electrode tip position(s) remain too high, the temperatures near the furnace hearth decreases and, if prolonged, can result in inadequate heating and melting of the metal and incomplete smelting of the oxides such as the silica. It is important to have the electrode tip(s) positioned so that the arc forms about a foot above the metal bath.

Satisfactory immersion or penetration of the electrode is achieved by providing the electrical insulating material along a substantial length of the upper electrode in a DC submerged arc furnace. Generally, about 1 to 3 feet of the electrode extends from the insulating material to provide exposed area for producing the arc, with the remaining portion of the electrode within the furnace being covered by the insulating material. Since the majority of the electrode is electrically insulated from the charge materials, the tip of the electrode can be immersed into the charge deeper than with uninsulated electrodes, and thus, achieve improved heating of the charge.

Achieving the satisfactory immersion or penetration of the electrodes of an AC submerged arc furnace into the furnace charge bed is dependent on several factors including the specific electrical resistivity or conductivity of the materials charged, proper selection and proportioning of materials in keeping with their specific electrical resistivity, their physical sizing, their distribution in the mix, and the operating voltage selected for the furnace. The operating voltage is selected to compensate for the relationship between the voltage, the electrode current, and the resistance of the charge materials to achieve deeper immersion of the electrodes into the charge. The resistance of the charge bed can be varied by varying the feed materials and size of materials to optimize operation to obtain the deepest electrode penetration in the charge bed for a given operating voltage.

The quantity of electrical energy required per ton of metal produced is highly dependent on the degree of oxidation or reduction of the metallic materials charged, the amount of silica and other oxides required to reach the desired or target composition, the optimization of the electrode submerged operation, and the skill of the furnace operator. Iron alloys containing from about 0.5 percent to 4 percent carbon and about 0.25 percent to about 2.5 percent silicon typically require about 500 to about 650 kilowatthours per ton of alloy produced. Higher silicon percentages and correspondingly lower carbon percentages require an increase of about 10 kilowatthours for highly non-oxidized iron sources for each additional 0.1 percent increase in silicon above about 2.5 percent silicon in the alloy.

The raw materials constituting the charge to be fed to the submerged arc furnace are preferably blended prior to feeding into the furnace. Alternatively, the different components of the charge can be fed simultaneously from separate supplies into the furnace at a controlled rate and in the desired ratios. The composition of the resulting foundry iron is dependent on the charge composition and the degree of chemical reduction which occurs in the furnace. In producing foundry iron, the charge materials comprise an iron source which includes scrap iron or scrap steel, a silicon source and a carbonaceous reducing agent as discussed hereinafter in greater detail. Generally, silica is the primary silicon source which can be supplied with the charge, supplied by the consumption of the electrode and the silica-containing insulation and combinations thereof. The melting of the iron and smelting of the silica and metal oxides in preferred embodiments is substantially in the absence of an oxygen feed or oxidizing agent and an absence of slag forming materials.

The scrap iron and scrap steel are available as commodities as known in the metal industry. The market prices and grades of various types of scrap iron and steel are published regularly in various industry publications such as *American Metal Market*. Scrap iron and steel as known in the art is graded according to the metal particle size and composition. For example, one type of scrap steel is defined as: "Foundry steel, 2' max." Suitable sources of iron for use in the present invention include iron ores, mill scale, direct reduced iron (DRI), hot briquetted iron (HBI), iron carbide, iron borings, steel turnings, shredded automobile steel and steel cans and mixtures thereof.

The composition of the scrap iron or steel will influence the composition of the resulting foundry iron. Several sources or grades of scrap iron can be blended prior to feeding to the furnace to provide the desired input and output compositions. The iron source generally comprises at least about 50 percent scrap, preferably about 75 percent scrap, and most preferably about 90 percent by weight scrap iron or scrap steel. The iron source can be based entirely on scrap iron or steel.

The scrap iron or steel can be mixed with other iron or steel materials to increase or decrease the percentage of various alloying metals in the resulting foundry iron composition. For example, direct reduced iron (DRI) and hot briquetted iron (HBI) which typically contain about 90 percent iron, and are low in undesirable residual elements, such as copper, can be added to increase the iron content of the foundry iron thereby diluting the alloying metals and reducing the percentage of undesirable metals, such as copper, chromium and manganese that are present in the other charge materials such as scrap steel used to produce the foundry iron. The amount and type of materials combined with the scrap iron and scrap steel are determined in part by the efficiency of the furnace in utilizing their components and the relative cost of the feed materials. For example, heavy steel scrap that is low in undesirable residual elements, is expensive in comparison with cast iron borings or steel turnings, so that large quantities of heavy scrap, while desirable from the standpoint of residual elements, are usually undesirable from an economic standpoint. By comparison, steel turnings, which are small in particle size and inexpensive compared to heavy steel scrap, usually contain high levels of undesirable residual elements. The use of the submerged arc furnace permits the use of very finely sized scrap materials, which, being less expensive than heavy scrap is an economic advantage for producing foundry iron over other processing methods.

The particle size of the charge material is important to obtain proper heating and melting of the scrap although there is no absolute limit. The scrap metal generally has a size of 60 centimeters or less in any one dimension. A suitable size of the scrap metal is about 25 millimeters or less. In alternative embodiments, the particle size of the scrap metal is less than about 0.5 centimeters. The particle size of the feed is selected to be easily handled and charged into the furnace and melted without forming a bridge between the electrodes or between the electrodes and the side walls of the furnace. The submerged arc furnace in accordance with preferred embodiments is able to handle a small particle size scrap such as cast iron borings and steel turnings less than about 0.25 inch in the largest dimension, which are traditionally difficult to process without such preprocessing steps as agglomeration or briquetting. For example, mill scale and mill wastes are generally 6 inches or less and DRI/HBI are about 1¼ to 6 inches in the largest dimension. The particle size of the scrap iron or steel can range from small fines or borings to large pieces. The upper size limit is generally the face to face spacing between the electrodes in an alternating current submerged arc furnace or between the electrode and the furnace refractory wall in a direct current submerged arc furnace to avoid bridging.

Scrap iron and scrap steel are highly conductive in comparison with iron ore so that in the use of scrap materials as the iron sources in the present process the electrode must be adequately insulated for a submerged arc furnace or the electrical conductivity and resistivity of the feed must be selected and controlled to permit deep immersion of the electrodes. The electrical resistivity of the feed can be modified by the selection of the particle size of the feed and the type of materials. Reducing the particle size of the feed material increases the resistivity of the feed. The most efficient particle size will depend on its inherent resistivity and the dependence of the permeability of the furnace charge to the passage of exhaust gases on the particle sizes of the charged materials.

Processing costs to reduce the particle size are also considered in selecting the particle size of the charge. In preferred embodiments, the feed material can contain substantially no iron ore although minor amounts of iron ores can be added to modify the resistivity of the feed. Highly oxidized mill waste or resistive iron sources can also be used to modify the resistivity.

The charge material can also include an amount of a silicon source such as, for example, silica, silica source or silicon dioxide in a reducible form. Silica is the preferred silicon source. The source of the silicon can be any commercially available material which can be smelted and reduced to silicon in the submerged arc furnace in the presence of a carbonaceous reducing agent simultaneously with the melting of the scrap iron and scrap steel. The silicon is produced in a form which can combine directly with the molten metal. In preferred embodiments, the silicon source is a high purity quartzite. In alternative embodiments, other sources, as known in the art, can be used such as silica-containing ore, waste residues and sand which has been washed to remove the clays and other impurities. Typically, the charge is substantially absent of ferrosilicon or silicon carbide. In preferred embodiments, the silicon source contains at least about 98 percent by weight silica. The impurities are preferably removed to avoid the formation of slag in the furnace since slag increases the energy demand for smelting and melting of the feed.

The quartzite used in preferred embodiments as the primary silica source is substantially free of clays and other extraneous materials such as metal oxides which would contribute to undesirable slag formation, as well as undesirable contamination of the resulting foundry iron with trace metals. The quartzite is generally sized, high purity quartzite pebbles or crushed quartzite containing at least 95 percent silica. The particle size of the source of silica is determined by the particular dimensions of the furnace, the electrodes and the residence time of the feed materials in the furnace to ensure complete reduction to silicon in the presence of a reducing agent. Generally, quartzite has a particle size of 4 inches or less although large furnaces can utilize larger particles. The source of silica preferably contains less than about 0.5 percent by weight aluminum, magnesium, zinc and titanium oxides. Some of these metals, such as zinc, can be oxidized and removed by a flow of air or oxygen through the furnace and removed in the baghouse. Other metal oxides are reduced in the furnace to the metal which can combine with the iron.

The amount of the silicon source added to the furnace with the feed is determined by theoretical calculations of the desired silicon content of the resulting foundry iron. The amount of the silicon source added is also based on stoichiometric calculations taking into account the calculated silicon content of the scrap iron and other feed metals and the calculated losses due to predicted volatilization in the reduction of silica to elemental silicon. The silicon source can be added in the amount of about 0.01 percent to about 20 percent by weight based on the weight of the scrap iron or steel. Typically, the silicon source is less than about 10 percent and preferably less than about 5 percent by weight of the scrap iron or steel. Generally, about 90 percent or more of the available silicon combines with the iron while the remaining silicon is lost as silica fume, and, if formed as slag. Silicon recoveries typically greater than 90 percent are experienced when alloys of 3% or less contained silicon are produced.

The carbonaceous reducing agent can be any carbon source capable of reducing silica in the furnace. Examples of suitable carbonaceous reducing agents include char, charcoal, coal, coke such as petroleum or bituminous coke, woodchips and mixtures thereof. The preferred carbonaceous materials have a high fixed carbon content and also have a low ash content, low moisture content, low calcium oxide and aluminum oxide levels, and low sulfur and phosphorous levels. The carbonaceous materials in preferred embodiments further have high reactivity and high electrical resistance. A preferred carbonaceous material for AC submerged arc furnace operations is bark-free, hardwood woodchips from a hardwood such as oak. Woodchips provide a source of carbon for reducing the silica to elemental silicon as well as a means of reducing the electrical conductivity of the feed in the furnace so that the electrodes can be deeply immersed into the submerged arc furnace to maintain the desired melting temperature of the scrap and smelting of the silica. The feed can contain about 5 percent to 40 percent by weight of the carbonaceous reducing agents based on the weight of the iron. Preferably, the feed contains at least about 5 percent carbonaceous reducing agents based on the weight of iron.

The amount of the carbonaceous reducing agent added to the feed is determined by calculating the stoichiometric amount of fixed carbon needed to reduce the silica to silicon and the amount of free carbon needed to provide the desired carbon content in the resulting foundry iron. The theoretical calculations are based on the fixed carbon content of the coal, charcoal, coke, woodchips or other carbonaceous reducing agent according to standard calculations as known in the metallurgical industry. The amount, type and particle sizes of the carbonaceous reducing agent affect the resistivity of the feed material. For example, charcoal can be used in large proportions to increase resistivity since preferred charcoals have a higher resistivity than coke or coal. The process can be conducted in the complete absence of coke.

The particle size of the carbonaceous reducing agent is selected according to the composition of the feed materials, the reactivity, and the electrical resistivity or conductivity of the feed composition. A suitable size of woodchips is generally about 6 inches or less in the longest dimension. A suitable size for metallurgical grade coke is about ½ inch or less. Coal is typically about 2 inches or less while char and charcoal are typically 6 inches or less in the largest dimension.

The charge composition preferably contains only minor amounts of sulfur, phosphorous, calcium, aluminum, chromium, zinc and other metals which are undesirable in foundry iron alloys. The use of charge materials having few impurities contributes to little or no slag formation. Operating the submerged arc furnace substantially in the absence of slag has the added benefit of the heat from molten iron preheating the feed material being charged to the furnace since there is little or no slag shielding the molten iron from the feed material. Slag formation is generally avoided whenever possible since the presence of slag increases the energy consumption and reduces the efficiency of the melting of the scrap and the reduction of the silica to silicon. Excessive slag formation also inhibits the flow of the feed materials to the heating zone of the furnace and increases the likelihood of bridging of the feed in the furnace.

In embodiments where the feed material contains high amounts of sulfur or other impurities, a slag forming component can be added as needed. Suitable slag forming components include limestone (calcium carbonate), lime (calcium oxide), or magnesia although other slag forming components as known in the art can be used. When necessary for efficient operation, lime having a particle size of less than 3 millimeters can be used.

In preferred embodiments, the process for producing foundry iron is carried out in the direct current (DC) submerged electric arc furnace configured with an electrically-insulating coating or sleeve surrounding the upper electrode for much of the distance that the electrode is extended into the furnace charge. The use of the DC submerged arc furnace facilitates deep penetration of the upper electrode into the charge materials and close proximity of the electrode tip to the metal bath. In an AC furnace, the charge conductivity must be controlled to permit deep electrode penetration at practical operating voltages. This deeper electrode penetration made possible by the insulated electrode configuration results in better heat transfer to the charge by the arc and the passage of hot reaction product gases through the relatively deeper charge bed, with consequent lowered specific electrical power consumption for the process.

The DC submerged arc furnace is also capable of processing a wider range of charge materials sizes, and may permit the elimination of some charge components, such as woodchips, which usually are required for satisfactory operation of AC submerged arc furnaces because of the much more stringent charge conductivity requirements.

The DC submerged arc furnace also is an advantage for the process because it allows operations at higher secondary voltages than an AC submerged arc furnace. This makes it possible to input more power into the DC furnace when operating at the same electrode current as the AC submerged arc furnace.

Another advantage of the DC submerged furnace for the process lies in its circular and cylindrical symmetry which allows more uniform charging of materials into the furnace, more uniform distribution of and heating of the charge by arc and the hot gaseous products of the reduction processes, and more uniform descent of the charge without bridging.

In embodiments of the invention, the process of producing foundry iron is carried out in a submerged arc furnace in the absence of iron ore and coke, and generally produces a foundry iron product having a temperature of between about 2100° F. to 3200° F. and less than about 0.1 percent by weight slag compared with 1 percent to 10 percent by weight slag of conventional foundry iron processes using a submerged arc furnace. Typically, the foundry iron is produced substantially in the absence of slag.

Embodiments of the process of the invention are disclosed in the following non-limiting examples.

EXAMPLE 1

A computer simulated operation consisted of a feed mix containing 2000 pounds of scrap iron, 100 pounds of woodchips, 85 pounds of coal, 20 pounds of coke and 75 pounds of quartzite charged into an alternating current submerged arc furnace at a rate of alloy production of 72.590 tons per hour. The projected power input to the furnace was 50,000 kilowatts. The simulated scrap iron feed was made up of 40 percent shredded auto steel, 15 percent remelt returns, 15 percent steel scrap #1, 20 percent Cast Iron borings, 5 percent tin plate/cans and 15 percent low chromium mixed turnings. The feed mix had a calculated alloy composition of 2.5 percent silicon, 3.85 percent carbon, 0.40 percent manganese, 0.10 percent chromium, 0.15 percent nickel, 0.15 percent copper, 0.01 percent sulfur, 0.05 percent phosphorus and 0.03 percent tin with the balance iron where the percentages are by weight.

The projected resulting iron product as tapped from the furnace had an iron content of 92.5 percent, a carbon content of 3.85 percent and a silicon content of 2.50 percent by weight with the balance impurities. The calculated energy consumption was 650 kilowatt hours per ton of the iron alloy.

EXAMPLE 2

A computer simulated production run consisted of a feed mix containing 2000 pounds of scrap iron, 100 pounds of woodchips, 210 pounds of coal, 25 pounds of coke, and 393 pounds of quartzite charged into an alternating current submerged arc furnace at a projected rate of alloy production of 34.68 tons per hour. The furnace power input selected was 50,000 kilowatts. The projected scrap iron was a blend comprising 40 percent shredded auto steel, 15 percent remelt returns, 10 percent mixed turnings, 20 percent Cast Iron borings, 5 percent tinplate/cans and 10 percent low chromium mixed turnings. The feed mix had a calculated alloy composition of 9 percent silicon, 1.5 percent carbon, 0.4 percent manganese, 0.18 percent chromium, 0.09 percent nickel, 0.19 percent copper, 0.14 percent sulfur, 0.03 percent phosphorous and 0.02 percent tin and the balance iron, where the percentages are by weight.

The projected resulting iron alloy as tapped from the furnace had an iron content of 87.87 percent, a carbon content of 1.50 percent and a silicon content of 9.01 percent by weight with the balance impurities. The calculated energy consumption was 1370 kilowatt hours per ton of the iron alloy.

EXAMPLE 3

A computer simulated run consisting of a feed mix containing 2000 pounds of scrap iron, 100 pounds of woodchips, 35 pounds of coal and 55 pounds of quartzite charged to an alternating current submerged arc furnace at a projected production rate of alloy of 80.922 tons per hour. The furnace power selected was 50,000 kilowatts. The scrap iron input was made up of 40 percent shredded auto steel, 15 percent remelt returns, 10 percent mixed steel turnings, 20 percent Cast Iron borings, 5 percent tinplate/cans and 10 percent low chromium mixed turnings. The simulated feed mix had an alloy composition of 2 percent silicon, 2 percent carbon, 0.40 percent manganese, 0.10 percent chromium, 0.15 percent nickel, 0.15 percent copper, 0.01 percent sulfur, 0.05 percent phosphorous and 0.03 percent tin and the balance iron where the percentages are by weight.

The projected resulting iron alloy as tapped from the furnace had an iron content of 94.52 percent iron, 2.05 percent silicon and 2.00 percent carbon with balance impurities. The calculated energy consumption was 600 kilowatt hours per ton of the iron alloy.

While several embodiments have been shown to illustrate the invention, it will be understood by those skilled in the art that various changes and modifications can be made therein without departing from the scope of the invention as defined in the appended claims.

What is claimed is:

1. A process of producing molten metal in an arc furnace comprising the steps of:

feeding an electrically conductive charge into an electric arc furnace with at least one first electrode having a lower end for cooperating with a second electrode, said at least one first electrode having an upper end coupled to a movable mounting structure for raising and lowering said electrode with respect to a charge bed in said furnace and having an electrically insulating material covering a portion of said first electrode and insulating said first electrode from the charge bed, said charge comprising at least one metal, metal compound or mixture thereof;

immersing at least said first electrode into said charge bed at a depth independent of the conductivity of said charge;

supplying electrical energy to said electrodes to generate an electric arc therebetween; and heating the charge in the furnace by the electrical arc between electrodes to produce said molten metal.

2. The process of claim 1, wherein said first electrode has a midsection between said upper and lower ends, and said electrically insulating material overlies and is bonded to said midsection.

3. The process of claim 1, wherein said electrically insulating material is a fiberglass mat wrapped around said first electrode forming an insulating layer having a lower end adjacent said lower end of said first electrode and wherein said charge includes a carbonaceous reducing agent; and said lower end of said insulating layer is consumed and reduced to supply silicon to said metal when electrical energy is applied to said electrode.

4. The process of claim 3, wherein said insulating material includes an adhesive bonding said insulating material to said first electrode.

5. The process of claim 4, wherein said adhesive is a sodium silicate or a tar-based adhesive.

6. The process of claim 1, wherein said insulating material is at least ¼ inch thick.

7. The process of claim 1, wherein said insulating material is a silica-containing material and is applied by spraying or dipping.

8. The process of claim 1, wherein said furnace is selected from the group consisting of plasma, AC and DC electric arc furnaces.

9. The process of claim 1, wherein said charge comprises at least one selected from the group consisting of aluminum, steel, iron, copper, magnesium, manganese, chromium and mixtures thereof.

10. A process of producing foundry iron comprising the steps of:

feeding an electrically conductive charge into an electric arc furnace about electrodes thereof, said charge comprising a mixture of an iron source, a silicon source and a carbonaceous reducing agent, said iron source comprising ore, mill scale, scrap iron or scrap steel, at least one of said electrodes being partially surrounded with an electrical insulating material for shielding a portion of said electrode from said charge material;

positioning said at least one electrode in said charge material at a depth independent of the conductivity of said charge material;

supplying electrical energy to said electrodes to generate an electrical arc therebetween; and heating the charge by the electrical arc between the electrodes to melt the charge, to reduce the iron source and silica, and to produce foundry iron.

11. The process of claim 10, wherein said charge comprises scrap iron or steel; and said process further comprises melting the scrap iron or steel and producing foundry iron having a carbon content of about 0.01 percent to about 4.5 percent by weight.

12. The process of claim 10, wherein said charge comprises scrap iron or steel; and said process comprises melting the scrap iron or steel and producing foundry iron having a silicon content of about 0.05 percent to about 9.5 percent by weight.

13. The process of claim 10, wherein said charge further comprises substantially pure quartzite or sand.

14. The process of claim 10, wherein the carbonaceous reducing agent is selected from the group consisting of wood chips, char, charcoal, coal, petroleum coke, bituminous coke and mixtures thereof.

15. The process of claim 10, wherein the iron source comprises at least 50 percent by weight scrap iron or steel.

16. The process of claim 10, wherein the charge further comprises about 0.01 percent to about 20 percent by weight silica as the silicon source based on the total weight of the scrap iron or steel.

17. The process of claim 10, wherein the charge comprises at least about 5.0 percent by weight of said carbonaceous reducing agents based on the weight of iron in the charge.

18. The process of claim 10, wherein said arc furnace is selected from the group consisting of plasma arc, alternating current submerged arc and direct current submerged arc furnaces.

19. The process of claim 10, wherein said insulated electrode has a lower end extending about 3 inches to 3 feet beyond said insulation.

20. The process of claim 10, wherein an electric potential of about 30–1000 volts is applied to said electrodes.

21. The process of claim 10, wherein said charge comprises silica;

said silica is smelted in the presence of the carbonaceous reducing agent to produce silicon; and a foundry iron having a silicon content of about 0.05 percent to about 9.5 percent by weight is produced.

22. The process of claim 10, wherein the iron source is melted in said furnace at a temperature between 2100° F. and 3200° F.

23. A continuous process of producing molten metal alloys comprising the steps of:

continuously feeding an electrically conductive charge comprising at least one metal source into an electric arc furnace about at least one electrode having an upper end coupled to a power source, a lower end, a main body section extending between said upper and lower ends and an electrical insulating material surrounding and attached to said main body section, said insulation material containing a metal enhancing additive;

positioning said at least one electrode in said charge at a depth independent of the conductivity of said charge;

supplying electrical energy to the electrode to generate an electrical arc; and melting said metal and simultaneously smelting said insulating material in the presence of a carbonaceous reducing agent by the electrical arc to produce molten metal.

24. The process of claim 23, wherein said charge comprises scrap iron or steel having a particle size of less than about 60 centimeters.

25. The process of claim 24, wherein the molten metal is foundry iron having a silicon content of about 0.05 percent to about 9.5 percent by weight, and a carbon content of about 0.01 percent to about 4.5 percent by weight.

26. The process of claim 25, wherein the foundry iron has a silicon content of about 2.0 percent by weight.

27. The process of claim 26, wherein
the said charge is fed into said furnace substantially in the absence of coke.

28. The process of claim 24, wherein
the carbonaceous reducing agent is selected from the group consisting of charcoal, wood chips, coal, coke and mixtures thereof.

29. The process of claim 24, wherein
the furnace is operated at a bath temperature between about 2100° F. and about 3200° F.

30. The process of claim 24, wherein
the metal enhancing additive is silica.

31. The process of claim 1, wherein said at least one first electrode forms an arc at a lower end thereof while substantially preventing arcing between a side of said electrode and said charge.

32. The process of claim 10, wherein said at least one electrode is positioned in said charge material to form an arc at a lower end thereof substantially without arcing through a side of said electrode.

* * * * *